T. F. GREENLEAF.
Flour-Dressing Machines.

No. 207,176. Patented Aug. 20, 1878.

WITNESSES:
C. Neveux
L. Sedgwick

INVENTOR:
T. F. Greenleaf
BY Munn & Co
ATTORNEYS.

UNITED STATES PATENT OFFICE.

THORO F. GREENLEAF, OF WESTBOROUGH, MASSACHUSETTS.

IMPROVEMENT IN FLOUR-DRESSING MACHINES.

Specification forming part of Letters Patent No. 207,176, dated August 20, 1878; application filed May 18, 1878.

*To all whom it may concern:*

Figure 1:
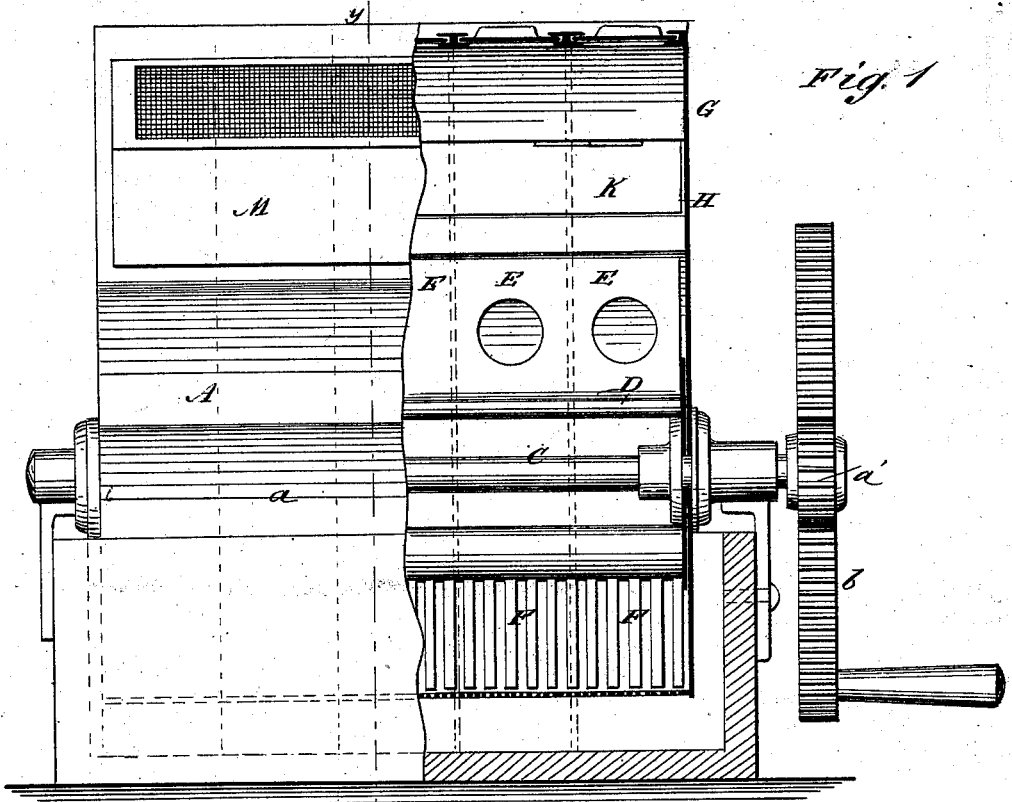
Figure 2:
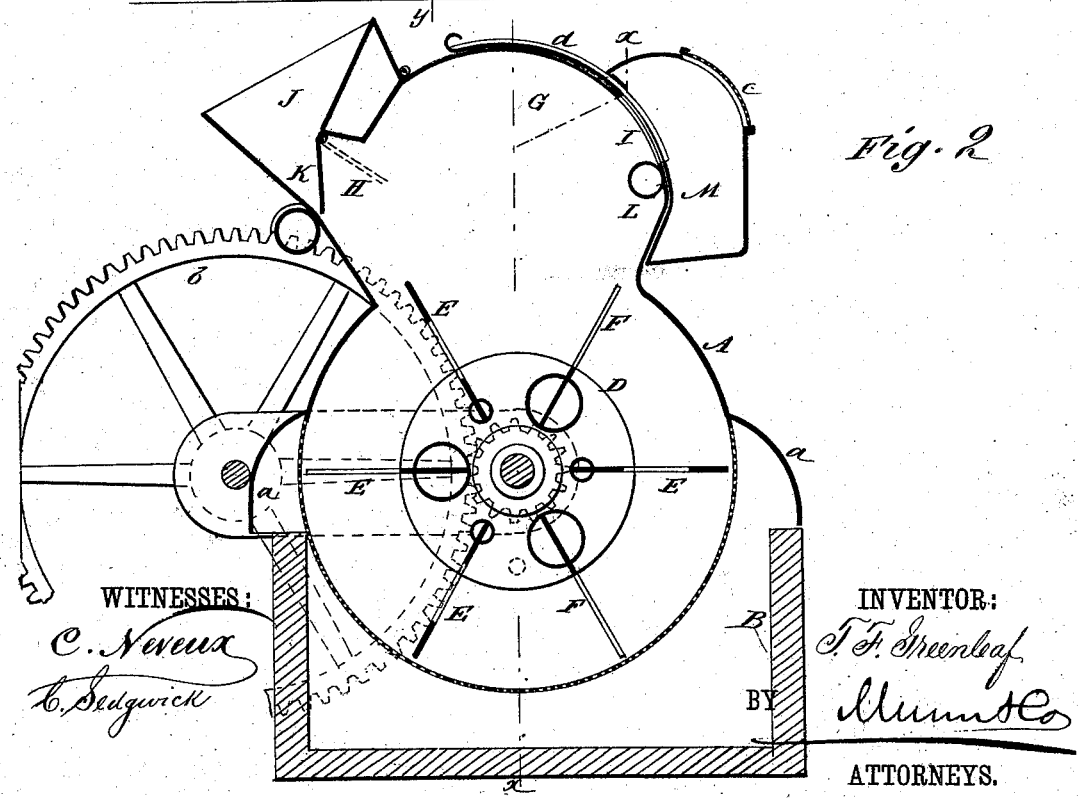

Be it known that I, THORO F. GREENLEAF, of Westborough, in the county of Worcester and State of Massachusetts, have invented a new and Improved Flour-Bolt, of which the following is a specification:

Figure 1 is a side elevation, partly in section, the section being taken on line $x$ $x$ in Fig. 2. Fig. 2 is a vertical transverse section taken on line $y$ $y$ in Fig. 1.

The invention will first be described in connection with the drawing, and then pointed out in the claims.

Referring to the drawing, A is a casing, the lower portion of which is cylindrical in form, and the lower half of the cylindrical portion is formed of wire-cloth, which is kept in shape by suitable stay-rods. Flanges or supports $a$ are attached to the sides of the casing A and rest upon the upper edges of the box or trough B, which receives the sifted flour that drops through the wire-cloth screen.

The box B is divided into compartments corresponding in number and position with the compartments in the casing A.

A shaft, C, whose axis coincides with the axis of the cylindrical portion of the casing A, is journaled in boxes supported by the box B, and carries a series of wheels, D, one in each compartment in the casing A. These wheels are each composed of three perforated wings or floats, E, and three wire brushes, F, which alternate with the wings or floats, and both wings and brushes are of sufficient width and length to fill the compartment.

The shaft C is provided with a pinion, $a'$, which is driven by a spur-wheel, $b$, that turns on a stud at the end of the casing, or it may be driven by any suitable motor, and will be driven at a suitable rate of speed to effect the separation of the flour and bran.

The upper portion, G, of the casing A has upon one side an opening, H, and upon the other an opening, I. Over the opening H a removable hopper, J, is placed, which is divided up into compartments which coincide in width and number with the compartments of the casing A, and each compartment is provided with a hanging door, K, which is hinged to the upper portion of the hopper, and is opened by the pressure of flour against it, but immediately closes of its own gravity after the flour has passed into the casing, thus preventing the dust from escaping.

The opening I is designed for the escape of chaff or bran, which is thrown up by the action of the wheel in the lower portion of the casing. Below and adjoining the opening I there is a small cylinder or bead, L, which extends the whole length of the casing parallel with the shaft. This cylinder projects into the casing the amount of its own thickness, and prevents the flour and other material being sifted from escaping through the opening I as it is thrown upward by the action of the wheel, while the lighter particles, such as bran or chaff, are driven through the opening I into a box, M, which is attached to the side of the casing to receive it.

The opening I is provided with as many sliding covers $d$ as there are compartments in the casing A, and the box M may be comparted, so as to receive the bran from each compartment of the casing A separately, if desired.

The box M is provided with a gauze-covered opening, $e$, which permits of the escape of air, but retains the bran.

The flour-bolt may be attached to a trough or other receptacle by means of thumb-screws, or may, if desired, be permanently attached.

When the brushes are revolved rapidly the greater part of the flour is pushed through the sieve underneath, while a small portion with the bran is carried round, hugging closely to the case. As the brushes cease to press it the mixture tends toward the outside of case; but the flour, being heavy, follows the case closely until it strikes the bead L, and then falls back, while the lighter bran is mostly thrown out.

Having thus described my invention, I claim as new and desire to secure by Letters Patent—

1. The flour-bolt casing A, composed of an upper solid and lower wire-cloth portion, and supported on trough B by the flanges $a$ starting out from the cylinder just above the wire-cloth portion thereof, as and for the purpose described.

2. The combination of the case, hopper, and trough A B D, the former provided with a chamber, G, over a wheel, D, said chamber opening into a hopper and chaff-chamber on opposite sides.

3. The combination, with case A, provided with a chamber, G, opening into a chaff-chamber, M, of the bead L, arranged, as shown and described, to prevent the flour thrown up by the wheel from being forced through opening I.

THORO F. GREENLEAF.

Witnesses:
J. W. FAIRBANKS,
CHAS. A. MATTEL.